United States Patent [19]

Kaufmann, Jr.

[11] 4,293,984

[45] Oct. 13, 1981

[54] SPRING TENSION FASTENER

[75] Inventor: John Kaufmann, Jr., 3716 Woodrow Ave., Pittsburgh, Pa. 15227

[73] Assignee: John Kaufmann, Jr., Pittsburgh, Pa.

[21] Appl. No.: 89,756

[22] Filed: Oct. 30, 1979

Related U.S. Application Data

[63] Continuation of Ser. No. 885,512, Mar. 13, 1978, abandoned.

[51] Int. Cl.³ .............................................. A44B 17/00
[52] U.S. Cl. ................................................. 24/221 R
[58] Field of Search ........... 24/221 R, 73 RM, 221 K, 24/221 A; 85/5 P

[56]  References Cited

U.S. PATENT DOCUMENTS

| | | | |
|---|---|---|---|
| 373,860 | 11/1887 | Steffey | 24/221 R |
| 1,857,530 | 5/1932 | Dandridge et al. | 24/221 R |
| 2,238,865 | 4/1941 | Purinton | 24/221 A |
| 2,355,196 | 8/1944 | Zahodiakin | 24/221 K |
| 2,798,277 | 7/1957 | Flora | 24/221 R |
| 3,123,880 | 3/1964 | Barry et al. | 24/221 R |
| 3,179,367 | 4/1965 | Rapata | 24/221 R |
| 3,990,131 | 11/1976 | Okamura | 24/221 R |

FOREIGN PATENT DOCUMENTS 573519 11/1945 United Kingdom ............. 24/221 A

Primary Examiner—Alexander Grosz

[57] ABSTRACT

A fastener to retain at least two members together under spring tension including a bolt having a fastener head shaped with two lateral extending protrusions respectively forming two shoulders for engagement of an outside surface of one of the members to be secured together. An opening is provided through the members to be secured together and at least the opening through the latter-mentioned member which is to be engaged by the shoulders of the fastener head is generally contoured to the shape of the fastener head such that the fastened head freely passes through this opening in keyhole fashion and the bolt is turned so that the shoulders of the fastener head ride up onto this outside surface clamping the members together under spring tension. Lock recesses may be provided in the outside surface of the member closest to the fastener head to receive the shoulders of the fastener head in locking engagement.

1 Claim, 4 Drawing Figures

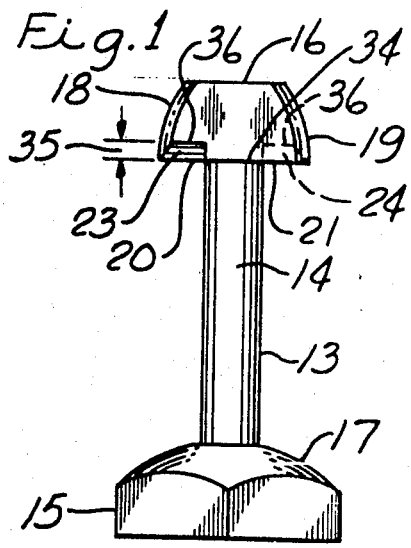
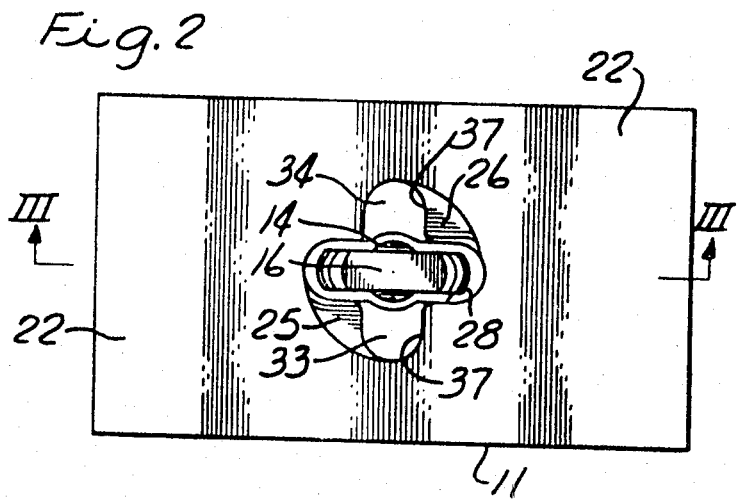
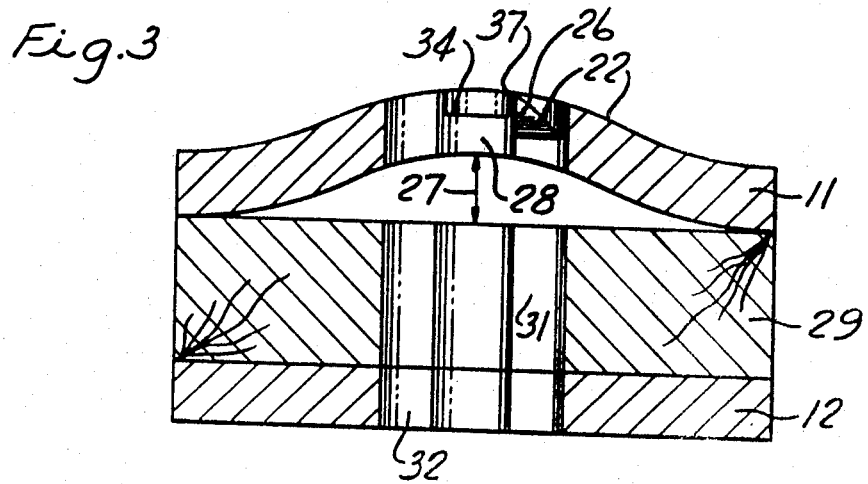
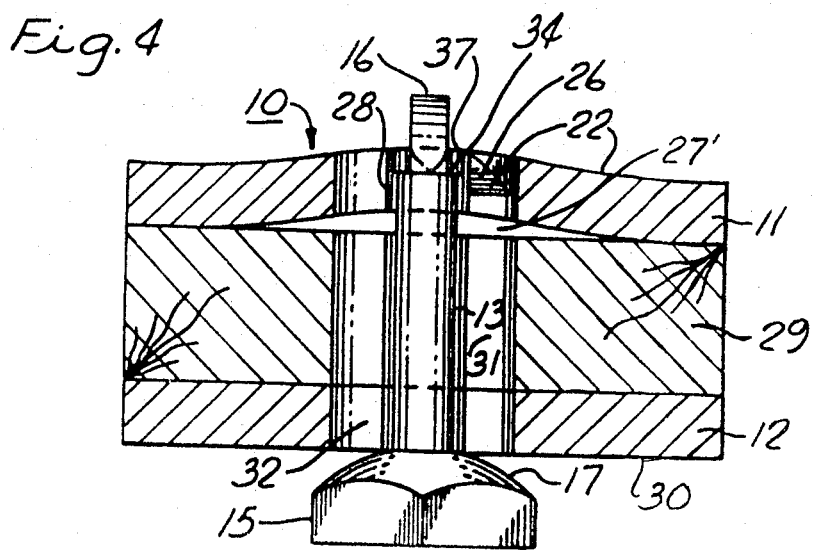

4,293,984

SPRING TENSION FASTENER

This is a continuation, of application of Ser. No. 885,512, filed Mar. 13, 1978, now abandoned.

BACKGROUND OF THE INVENTION

This invention relates generally to fasteners and more particularly to bolt type fasteners for securing a plurality of members together under spring tension.

The conventional bolt-type fastener generally consists of a threaded bolt and nut combination with the possible addition of lock washers and the like. In situations where tampering or vandalism may be a problem when fasteners are employed to secure parts together, such as vital pipe couplings, rail systems, etc., which are exposed to vandalism or tampering in sparsely populated areas, common fastening systems are not appropriate, as they may be readily unassembled by most anyone with little skill and equipment.

In addition, conventional fasteners can readily lose their retaining tension over a period of time and also require considerable time to assemble and secure the fasteners.

It is a principle object of the present invention to provide a fastener which eliminates these difficulties.

SUMMARY OF THE INVENTION

The fastener of the present invention is provided to retain at least two members together under tension and includes a bolt member with a shank having a bolt head secured at one end and a fastener head secured to the other end. The fastener head forms at least two uniformly and circumferentially spaced lateral protrusions which respectively provide shoulders that face the bolt head to engage an outside surface of a member to be fastened. Generally just two such lateral projections will be provided.

The two or more members to be retained together by the bolt member are provided with aligned openings therethrough to freely pass the fastener head but not the bolt head. One of these members is the aforesaid member to be fastened and the opening, at least in this member to be fastened, conforms in keyhole fashion to the general configuration of the perimetric outline of the fastener head as it is viewed from the outside end thereof in order to prevent withdrawal of the fastener head through the openings when the fastener head, and entire bolt member for that matter, is rotated such that the fastener head is in misalignment with the aforesaid keyhole opening. Spring means is provided for continually urging these members apart under the retention of the bolt member when the aforesaid shoulders of the fastener head are in engagement with the outside surface of the aforesaid member to be fastened. This spring means generally consists of one of the outside members itself which are to be fastened together in the form of a stiffly flexible plate or member, such as spring steel, and a flexure gap is provided immediately under the opening passing through the member to provide a flexure space for the member and continuous spring bias in the fastening.

A cam surface is preferably provided on the outside surface of the member to be fastened or on the aforesaid shoulders of the fastener head to permit the shoulders to more readily ride up onto the outside surface of the member to be secured or fastened under spring bias when the fastener head of the bolt member is passed through the opening and rotated to fasten the members together under tension. Such cam surfaces may be provided on both the shoulders of the fastener head and the outside surface of the member to be fastened if desired.

A lock recess in this same outside surface of the member to be fastened or adjacent the fastener head is provided for each of the shoulders of the fastener head and these recesses are cooperatively arranged in this outside surface to simultaneously receive the respective shoulders of the fastener head under the bias of the spring means after the shoulders ride up onto the outside surface by rotation of the bolt member in order to lock the bolt member in its fastened or secured position. These lock recesses can be made deeper than the vertical rise of the cam surfaces on the aforesaid shoulders to insure locking of the shoulders of the fastener head in their respective recesses under the bias of the spring means.

The pin expansion fastener of the present invention automatically adjusts itself under spring tension for expansion and contraction. Even as the tension capabilities of the fastener assembly lessens over years of use, it nevertheless will always maintain sufficient fastening and locking tension.

The pin expansion fastener of the present invention may also be utilized for mine roof bolt assemblies or similar fastening assemblies. In this application, one end of the roof bolt shaft is anchored in the mine roof hole or bore with resins in the conventional manner and the other end is exposed beyond the face of the mine roof and threaded to receive a nut. A curved face plate member having a central opening is then inserted over the threaded end of the bolt shaft and engages the mine roof face adjacent the aforesaid bore opening, with the convex face of the plate member being outwardly exposed. This face plate or bearing plate member provides the aforesaid stiffly flexible plate or spring member. In this application, the aforesaid fastener head is provided in the form of a nut which is threadably received on the exposed threads of the mine roof bolt shaft. The fastener head nut is provided with the same aforesaid lateral protrusions (preferably two), and the bearing plate member (which also acts as the aforesaid spring means) is provided with the aforesaid locking recesses to respectively receive the lateral protrusions of the fastening head nut.

These shoulders on the fastener head nut are likewise provided with cam surfaces so that the shoulders may ride up out of their respective locking recesses when tightening torque is applied to the nut. Thus, if the mine roof bolt or fastener loses tension, the fastener nut may be torqued down additional turns with the shoulders riding into and out of the respective recesses until the desired torque is obtained. The shoulders then finally rest in their respective recesses in the outer face of the plate member, under the spring tension of the plate member, and the fastener cannot accidentally loosen itself, as the cam surfaces on the shoulders of the nut only permit the nut to be rotated out of the respective locking recesses in the direction of increasing torque.

In any of the aforesaid applications, the spring plate can, of course, actually be one of the members itself which are to be fastened together or it may be a separate or independent piece supplied merely for the purpose of supplying spring tension. In addition, the thickness of the members to be fastened together and the length of the pins can be varied to any desired length.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a view in side elevation of one embodiment of the bolt member utilized in the fastener of the present invention.

FIG. 2 is a plan view of one embodiment of the fastener of the present invention incorporating the bolt member illustrated in FIG. 1 in position just prior to rotation of the bolt member to effect locking engagement of the fastener under spring bias.

FIG. 3 is a sectional view in side elevation of the fastener illustrated in FIG. 2 as seen along section line III—III with the bolt member removed to better expose the interior.

FIG. 4 illustrates the fastener of FIG. 3 showing the inclusion of the bolt fastener head of FIG. 1 in end view.

DETAILED DESCRIPTION OF THE DRAWINGS

Referring to the drawings, the fastener 10 as show fully assembled in FIG. 4 consists basically of two members 11 and 12 retained together by a bolt member fastener head 16. Bolt member 13 is shown in side elevation in FIG. 1 and in end elevation in FIG. 4.

Bolt member 13 consists of shank 14 having bolt head 15 secured to one end and fastener head 16 secured to the other end. Bolt member 13 may be made of any suitable material such as forged steel.

The head 15 may take on any number of different conventional configurations and is illustrated here as a four-sided head having a rounded base 17. Base 17 need not necessarily be rounded and may take on any desired curvature or it may be flat.

Fastener head 16 provides or forms two uniformly and circumferentially spaced lateral protrusions 18 and 19. More than two such protrusions may be provided, but the use of only two is preferred and provides the simplest construction. These lateral protrusions 18 and 19 respectively provide shoulders 20 and 21 which face bolt head 15. These shoulders 20 and 21 are provided to engage the outside surface 22 of member 11 to be fastened. Shoulders 20 and 21 of fastener head 16 are provided with cam surfaces 23 and 24 respectively to permit these shoulders to readily ride up onto outside surface 22 of member 11 under a spring bias when the bolt member is rotated from the position shown in FIG. 2 to the position shown in FIG. 4, the latter position being the locked or fastened position. To assist in this camming effect, surface 22 is also respectively provided with two cam surfaces 25 and 26 to engage and mate in sliding engagement with cam surfaces 23 and 24 respectively of bolt member 13. However, it is not necessary to provide both sets of cam surfaces. In other words, the cam surfaces may be provided on just the bolt member 13 or on just the outside surface 22 of member 11. In fact, all cam surfaces may be eliminated, but one set is preferable in order to assist the ability of fastener head 16 to ride up onto the outside surface 22 and thereby draw down upper member 11 under spring tension.

The lower member 12 to be fastened consists of a steel plate and the upper member 11 consists of a spring steel plate having a slight convex configuration to provide flexure gap 27 immediately under the opening 28 through member 11. Member 11 is stiffly flexible and when bolt member 13 is rotated from the position illustrated in FIG. 2 to the locking position illustrated in FIG. 4, cam surfaces 23 and 24 ride up on top of cam surfaces or ramps 25 and 26 thereby drawing member 11 downwardly under spring tension.

Sandwiched between plate members 11 and 12 is a wood member 29. For the purpose of illustration, all three members 11, 12 and 29 are being fastened together. These three members have aligned openings therethrough to freely pass fastener head 16 but not bolt head 15, the bearing surface 17 of bolt head 15 engaging the outer surface 30 of member 12.

This series of aligned openings 28, 31 and 32, conform in keyhole fashion to the general configuration of the perimetric outline of fastener head 16 as viewed from the outside end thereof and as illustrated in FIG. 2 to prevent withdrawal of fastener head 16 through the openings when fastener head 16 is rotated in misalignment with keyhole opening 28 from the position shown in FIG. 2 to the lock or fastening position illustrated in FIG. 4.

Lock recesses 33 and 34 are provided in outside surface 22 of member 11 and are cooperatively arranged to simultaneously receive respectively shoulders 20 and 21 of fastener head 16 under the bias of spring means provided by the flexure ability of member 11 and gap 27 after shoulders 20 and 21 ride up onto outside surface 22 via cam surfaces or ramps 25 and 26 respectively. Recesses 33 and 34 are deeper than the vertical rise 35 of the cam surfaces 23 and 24 to insure locking of these shoulders in their respective recesses under the bias of the spring means. This is best illustrated in FIG. 4 wherein it can be readily seen that in this locked or fastened position fastener head 16 is seated and locked in recesses 33 and 34 and bolt member 13 cannot be rotated in either direction as the uppermost portion 36 of cam surfaces 23 and 24 still lies below the top edge 37 of the recesses.

In order to assemble the fastener of the present invention, fastener head 16 is inserted respectively through openings 32, 31 and 28 to the ready position illustrated in FIG. 2. Bolt head 15 is then engaged with any conventional wrench and the bolt head is turned a quarter turn or 90° clockwise as viewed from the bottom of FIG. 4 such that shoulders 20 and 21 ride up on ramps 25 and 26 respectively thereby drawing bowed member 11 downwardly under spring tension until shoulders 20 and 21 simultaneously drop into recesses 33 and 32 respectively to lock the assembly in secured or fastened position. This causes stiffly flexible member 11 to depress downwardly to decrease the flexure gap 27 to that illustrated at 27' in FIG. 4. In fact, the fastener assembly may be designed such that gap 27' is eliminated completely when the fastener is in its finally assembled position.

I claim:

1. A spring tension fastener for tightly securing together in face-to-face relationship at least a pair of plate members substantial thickness fixed relative to each other, one of said plate members being formed of spring material and being arched to form a gap between it and the opposing plate member when the arched plate member of spring material is in a relaxed state, the opposing plate member being substantially flat, both of said plate members being provided with through openings which are elongated and which are in registration with each other, the face of the arched plate member formed of spring material away from the opposing flat plate member being provided with ramp surfaces at diametrically opposed locations and being further provided at diametrically opposed locations between the ramp surfaces with locking recesses, the common axis longitudinally across the locking recesses being at right angles to the major axis of said elongated openings, and a rigid pin fastener element including a straight shank adapted to pass through said registering openings of the plate members and having a turnable head with a rounded interior end face and wrench flats on one end of the shank of a size unable to pass through said openings and bearing against the face of the flat plate member distant from the arched plate member and also having an elongated fastener head at the other end of the shank extending transversely and equidistantly beyond opposite sides of said shank, the fastener head having a side profile and an end profile approximating the configuration of the elongated openings and being sized to pass therethrough axially of the registering openings, said fastener head having diametrically oppositely disposed flat cam faces on its interior side adapted to rotationally pass over said ramp surfaces and drop into said locking recesses with the fastener head then being arranged across the major axis of said elongated openings, the arched plate member of spring material then exerting tension on said rigid pin fastener element.

* * * * *